(12) United States Patent
Anderson

(10) Patent No.: US 6,302,475 B1
(45) Date of Patent: Oct. 16, 2001

(54) MULTI-LEVEL EXPANDABLE TRAILER

(76) Inventor: Ronald L. Anderson, 2 Widewater Rd., Hilton Head, SC (US) 29926

( * ) Notice: Subject to any disclaimer, the term of this patent is extended or adjusted under 35 U.S.C. 154(b) by 0 days.

(21) Appl. No.: 09/634,359

(22) Filed: Aug. 9, 2000

Related U.S. Application Data

(60) Provisional application No. 60/147,929, filed on Aug. 9, 1999, now abandoned.

(51) Int. Cl.$^7$ ...................................................... B60P 3/34
(52) U.S. Cl. ..................... 296/175; 296/24.1; 296/26.04; 296/26.12
(58) Field of Search ..................................... 296/156, 164, 296/171, 172, 173, 175, 176, 24.1, 26.02, 26.04, 26.12

(56) References Cited

U.S. PATENT DOCUMENTS

| | | | |
|---|---|---|---|
| 1,964,894 | * | 7/1934 | Rohne ................................ 296/26.02 |
| 2,739,833 | * | 3/1956 | Schenkel et al. ..................... 296/171 |
| 2,862,253 | * | 12/1958 | Place ................................ 296/171 X |
| 2,862,759 | * | 12/1958 | Huth .................................... 296/171 |
| 3,608,954 | * | 9/1971 | Lynd .................................... 296/164 |
| 4,103,958 | * | 8/1978 | Parent .................................. 296/165 |
| 4,449,746 | | 5/1984 | Clark . |
| 4,488,752 | | 12/1984 | Broussard . |
| 4,955,661 | * | 9/1990 | Mattice ................................ 296/171 |
| 5,197,774 | | 3/1993 | Diaz . |
| 5,860,686 | * | 1/1999 | Tiedge .............................. 296/175 X |
| 5,915,774 | | 6/1999 | Tiedge . |
| 6,082,799 | * | 7/2000 | Marek ................................. 296/24.1 |
| 6,098,346 | * | 8/2000 | Miller et al. ..................... 296/24.1 X |
| 6,108,983 | * | 8/2000 | Dewald, Jr. et al. ............. 296/171 X |
| 6,109,683 | * | 8/2000 | Schneider .............................. 296/171 |
| 6,135,525 | * | 10/2000 | Amann .............................. 296/164 X |

* cited by examiner

Primary Examiner—Stephen T. Gordon
Assistant Examiner—Patricia Engle
(74) Attorney, Agent, or Firm—Andrus, Sceales, Starke & Sawall, LLP

(57) ABSTRACT

A reconfigurable, dual level trailer has a fixed length, a variable width, a variable height and a longitudinal axis. The trailer includes a lower body portion supported on a set of wheels and having a front wall, a back wall and a pair of opposite side wall. An upper body portion is disposed upon the lower body portion and has a fixed lower segment which telescopically fits within a movable upper segment. The lower segment has a front wall, a back wall and a pair of opposite side walls. The upper segment has a front wall, a back wall and opposite side portions in the form of continuous windows along the entire length of the trailer and a roof. A horizontal partition extends along the length of the trailer between the upper body portion and the lower body portion to define an upper level and a lower level. The mid-portion of each side wall of the lower body portion is recessed to receive a pod which is slidably mounted along a horizontal axis generally perpendicular to the longitudinal axis to selectively adjust the volume and the width of the lower level. The upper segment is slidably mounted along a vertical axis generally perpendicular to the longitudinal axis to selectively adjust the volume and the height of the upper level.

14 Claims, 8 Drawing Sheets

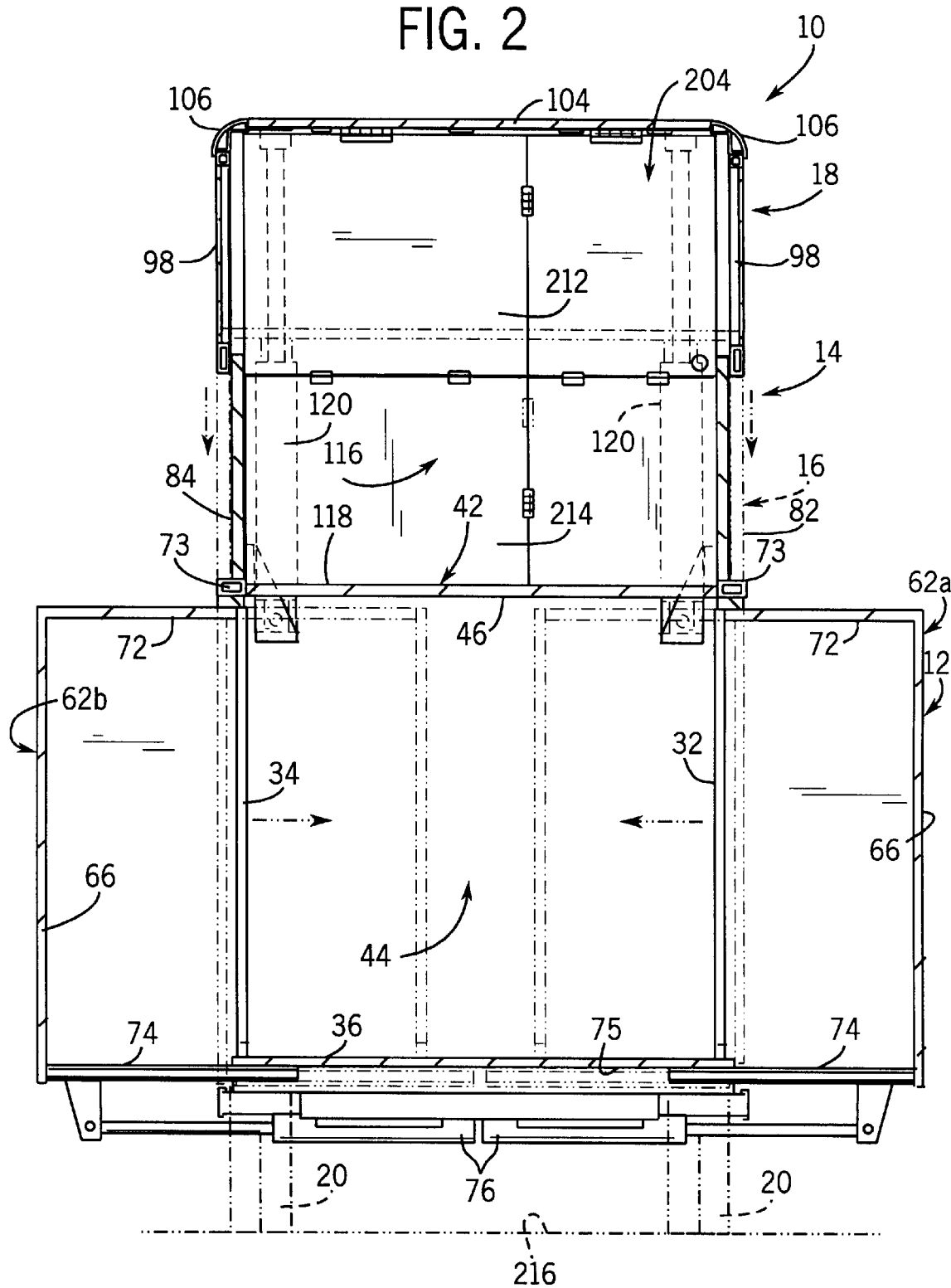

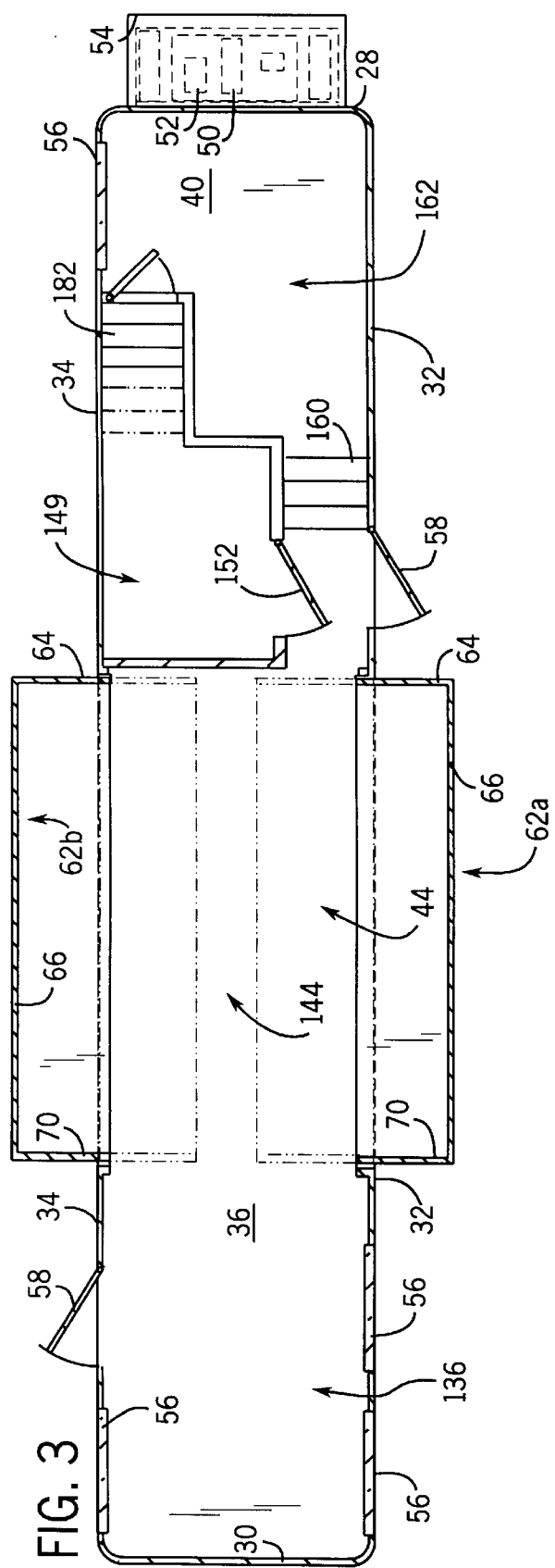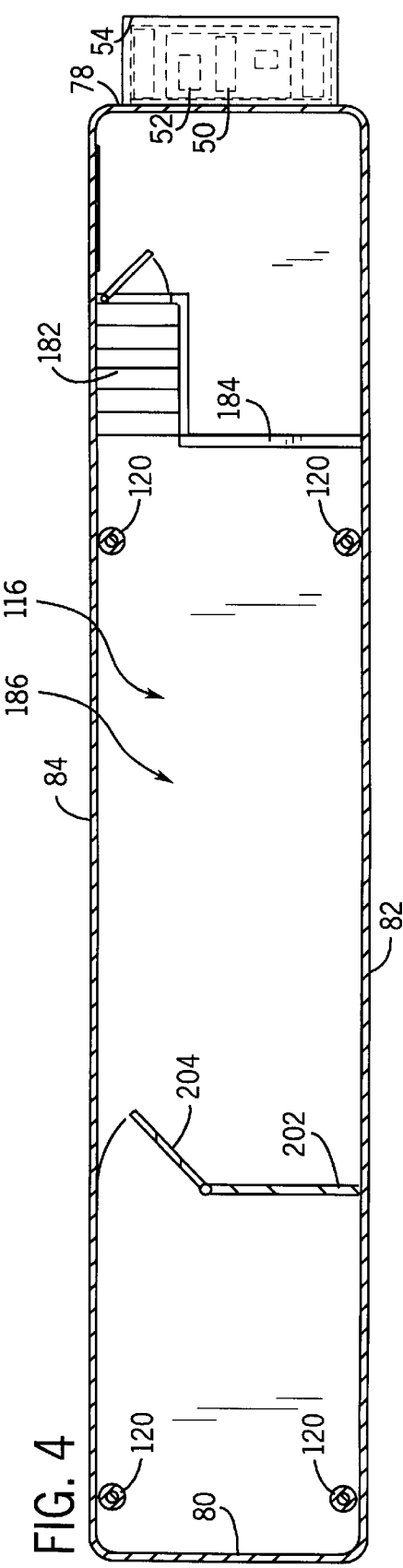

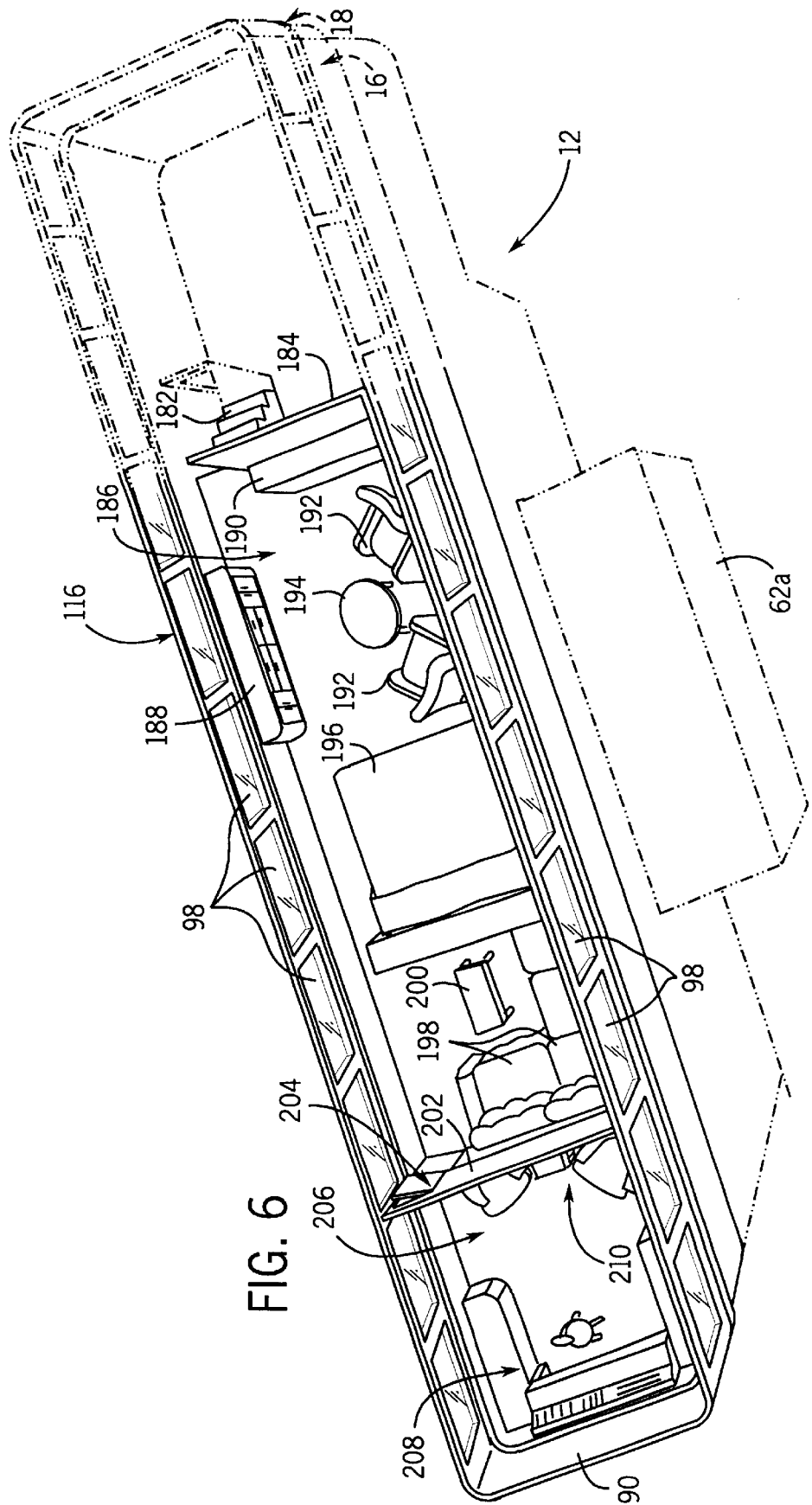

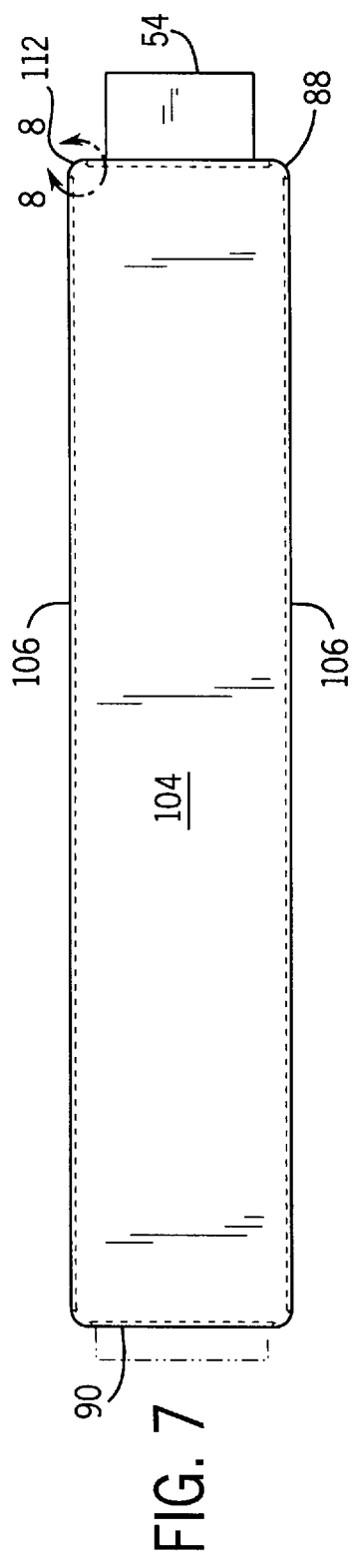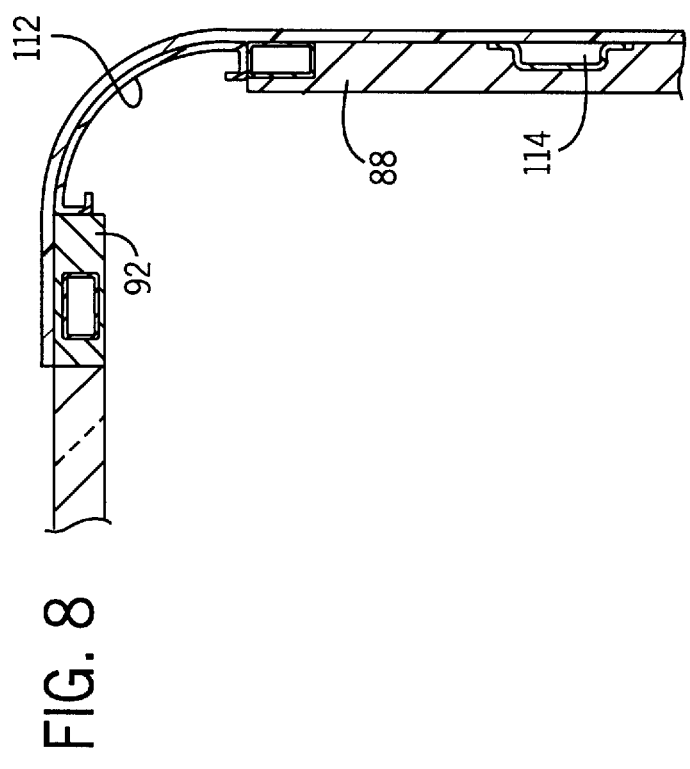

MULTI-LEVEL EXPANDABLE TRAILER

CROSS REFERENCE TO RELATED APPLICATIONS

This application is related to Provisional U.S. Patent Application Ser. No. 60/147,929 filed Aug. 9, 1999, now abandoned.

FIELD OF THE INVENTION

The present invention relates generally to human transport vehicles and, more particularly, pertains to a customized, multi-compartment trailer which is selectively reconfigurable to provide variously-sized living and/or office working space.

BACKGROUND OF THE INVENTION

For some years, buses, coaches, trailers and other vehicles have been modified and customized with various equipment and amenities to provide high-end, luxury motor homes and/or fully functioning traveling offices. Such vehicles are commonly designed with modular or multi-compartment construction, and can be retrofit to include, for example, a lounge, eating and sleeping quarters, an audio/visual facility, a lavatory, or the like. The special construction of these vehicles is provided to meet the particular needs and lifestyle requirements of certain clientele, such as television and motion picture celebrities, touring musical acts, corporate executives, famous athletes, politicians, sports teams and special interest groups. Several such buses and coaches of the type described above are commercially available from the assignee of the present invention.

In addition, there are other known multi-compartment vehicles which are modified to suit the needs of its human passengers. One type of customized vehicle is depicted in U.S. Pat. No. 4,449,746, issued May 22, 1984 to Clark who sets forth a modular unit having a multi-compartment floor for mounting medical equipment.

Another customized vehicle is shown in U.S. Pat. No. 4,488,752, issued Dec. 18, 1984 to Broussard. In this patent, an expandable mobile home trailer has a floor plan with a split level and includes an upper body portion which is telescopically associated with the main body portion.

U.S. Pat. No. 5,197,774 issued Mar. 30, 1993 to Diaz discloses a motor coach having a fixed lower level and a fixed upper level accessible by stairs positioned in the middle of the lower level. The coach is designed and furnished to provide a mobile broadcasting studio.

U.S. Pat. No. 5,915,774 issued Jun. 29, 1999 to Tiedge shows a motor coach including a first occupiable section and a second occupiable section designed to move laterally relative to the first section to adjust the volume of an occupiable living space.

In the past, these multi-compartment, customized vehicles have been limited by size restriction so as to ensure safe transit on roads and highways. Some customized vehicles have also been limited with respect to internal living space available during vehicle travel. Recent Federal law changes have now made it possible to increase the permissible travel size of certain of these vehicles, namely trailers, so that passenger capacity and available storage and amenity space can be correspondingly increased to satisfy the demands of its clients.

Despite the known prior art, it remains desirable to provide a fully appointed, mobile, multi-purpose residence which presents a maximum amount of floor space and headroom for occupants in a parked condition. It is also desirable to provide a customized trailer which offers the ultimate in travel comfort and convenience. It is further desirable to provide a high occupancy vehicle which is extremely safe and undeniably versatile.

SUMMARY OF THE INVENTION

The present invention advantageously provides a mobile trailer which is selectively collapsible and expandable along at least two axes of movement. The trailer includes a lower body and an upper body portion having a fixed lower segment telescopically received in a movable upper segment. The trailer further includes a pair of movable pods which are selectively and jointly extendable and retractable along a horizontal axis which is perpendicular to a longitudinal axis of the trailer. The movable upper segment of the upper body portion of the trailer is selectively extendable and retractable along a vertical axis which is perpendicular to the longitudinal axis of the trailer. The movable upper segment is provided with side portions formed by continuous windows so as to provide a generous amount of ambient light to illuminate the interior of the trailer. Top and corner edges of the trailer are constructed with rounded surfaces which create an aerodynamic, aesthetically pleasing profile.

It is one object of the present invention to provide a fully self-contained, mobile residence and business facility.

It is further object of the present invention to provide a modified trailer having a multi-level floor plan which defines a sitting room, a lounge with adjoining entertainment area and sofa pod, a bathroom, a kitchen, a sound studio, and a bedroom.

It is another object of the present invention to provide a deluxe, customized living and working quarters equipped with high quality furnishings, as well as high tech audio-visual and communication devices, and constructed with the finest materials.

Still another object of the present invention is to provide a mobile trailer having on-board support systems which will enhance the comfort of its occupants.

Another object of the present invention is to provide a mobile trailer having safety equipment which will safeguard the well being of its passengers.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 2 is a cross sectional view taken on line 2—2 of FIG. 1A;

FIG. 3 is a cross sectional view taken on line 3—3 of FIG. 1A showing a lower level of the trailer;

FIG. 4 is a cross sectional view taken on line 4—4 of FIG. 1A showing an upper level of the trailer;

FIG. 6 is a perspective view of the upper level in the park position with the trailer in a vertically expanded condition;

FIG. 7 is a top view of the roof of the trailer; and

FIG. 8 is a detailed view of rounded corner structure in the trailer.

DETAILED DESCRIPTION OF THE INVENTION

Figure 1:
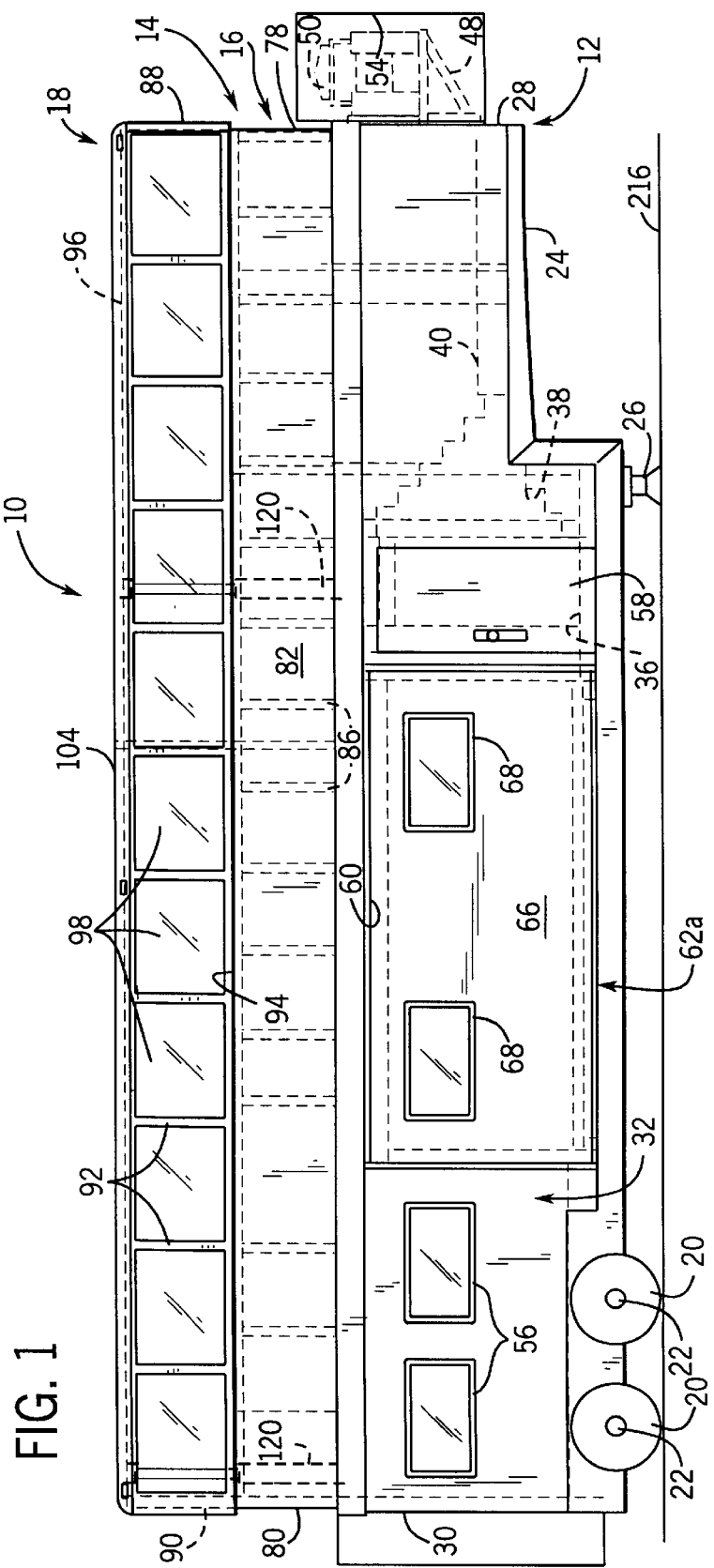
FIG. 1 is a side elevational view of the multi-level, expandable mobile trailer embodying the present invention and showing the trailer in an expanded and parked position.

Referring now to the drawings, FIG. 1 shows a multi-level, expandable trailer 10 embodying the present invention in an expanded and parked condition. Trailer 10 has a lower body portion 12 and an upper body portion 14 having a fixed lower segment 16 which telescopically fits within a movable upper segment 18, as best seen in FIGS. 1 and 2. Lower body portion 12 is supported on wheels 20 which are rotatably mounted on a pair of axles 22. FIG. 2 preferably shows two wheels 20 on each side of the trailer 10, but one or more wheels can be utilized on each side as desired. Wheels 20 are provided with suitable air ride suspension and air brakes to enable a safe, comfortable ride during transit. A forward, bottom section of lower body portion 12 is stepped at 24 to receive a fifth wheel connection of a semi-tractor (not shown) which is used to transport the trailer 10 from one location to the next. In the parked condition with the semi-tractor removed, the trailer 10 is equipped with a set of commercially available leveling cylinders (one being shown at 26).

Figure 1A:
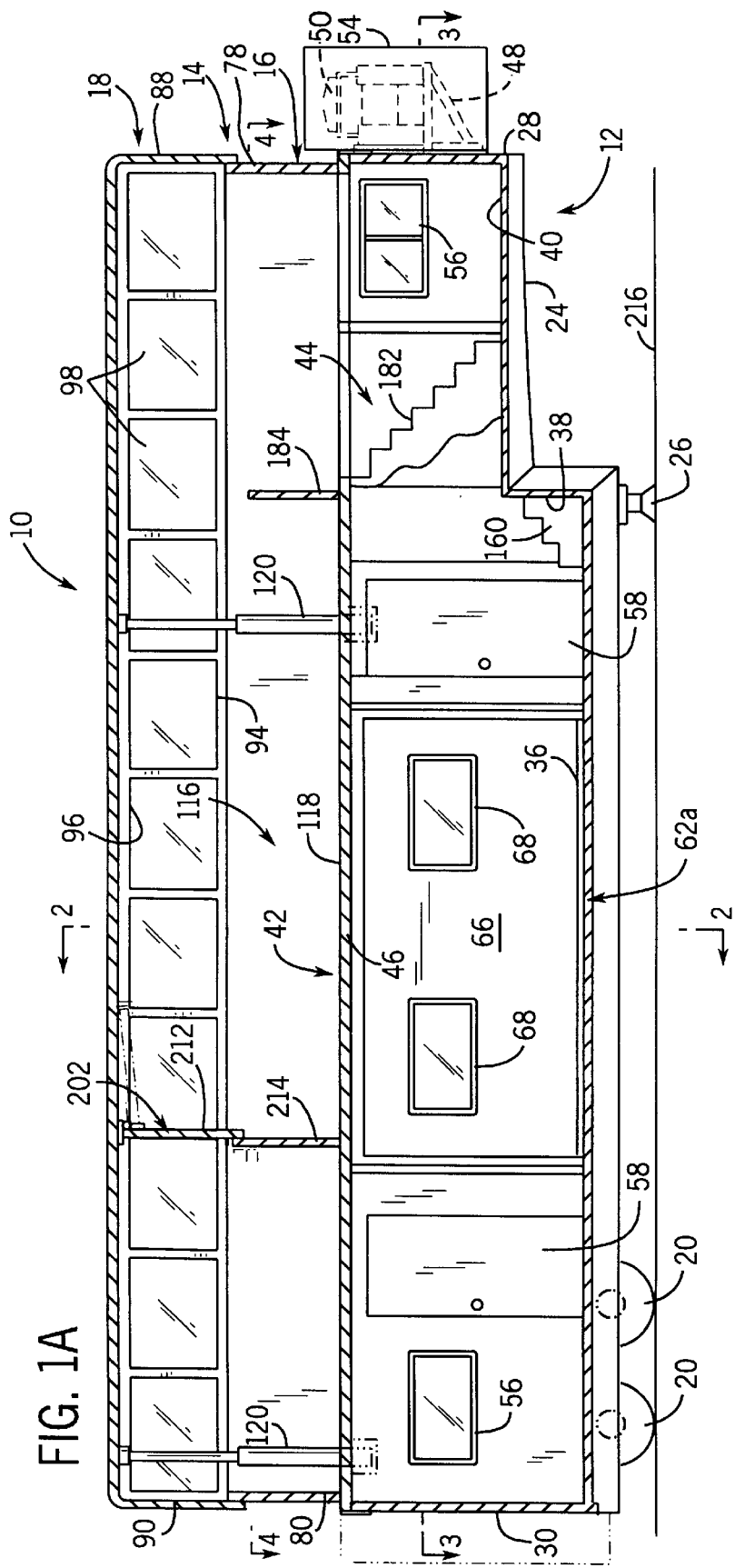
FIG. 1A is a longitudinal cross-sectional view of the trailer in FIG., 1 showing a lower level and an upper level.

Referring also to FIGS. 1A and 3, lower body portion 12 is constructed with a front wall 28, a back wall 30, a pair of opposite side walls 32,34 and a lower horizontal wall 36 which defines a main floor. In stepped lower body portion, main floor 36 rises along a vertical wall 38 and terminates in a raised landing 40 which defines an offset auxiliary floor. A horizontal partition 42 extends along the length of trailer 10 in parallel relationship with main floor 36 and auxiliary floor 40. Partition 42 is connected to the top of the front wall 38, back wall 30 and side walls 32,34, all of which are solid surfaces which collectively form a first interior space and a lower level 44. The partition 42 has a lower surface 46 which acts as a ceiling in the lower level 44.

Projecting outwardly from the front wall 28 is a mounting shelf 48 which carries a diesel generator 50 and other power equipment 52 used to electrically drive various comfort systems and appliances inside the trailer 10. The mounting shelf 48 and power equipment 50,52 are generally surrounded with a sound-attenuating, aerodynamic cover 54 which protects the equipment from environmental elements, such as bad weather, road dirt and the like. Side walls 32,34 are provided with a series of windows 56 and an outwardly opening door 58 positioned at different locations on each side to make observation as well as entry into and exit from trailer 10 convenient. Steps with handrails can be provided beneath each door 58 to ease access to the trailer 10.

The mid-portion of each side wall 32,34 in lower body portion 12 is recessed at 60 io receive a horizontally movable pod 62a,62b, each having an anterior wall 64, a lateral wall 66 provided with a set of windows 68, and a posterior wall 70. In addition, as seen in FIG. 2, each pod 62a,62b has a top wall 72 and a bottom wall 74 which together with adjoining walls 64, 66 and 70 are slidably guided into and out of each side wall 32,34 in lower level 44, typically by a power actuated device 76. More particularly, top walls 72 slide in and out with respect to side wall upper beams 73, while bottom walls 74 slide in an out with respect to a tubular structure 75 or the like beneath main floor 36. The pods 62a,62b are constructed and arranged to jointly extend and retract between the pod phantom lines of FIG. 2 which represent a collapsed and travel condition, and the pod solid lines which denote the expanded and parked condition. In the travel condition, the lateral walls 66 of the pods 62a,62b are substantially flush with the side walls 32,34. As will be understood hereafter, the pods 62a,62b serve to selectively adjust the volume of the occupiable lower level internal space, and controllably vary the overall width of the trailer 10.

Fixed lower segment 16 of upper body portion 14 like lower body portion 12, includes a front wall 78, a back wall 80 and a pair of opposite side walls 82,84, all of which are solid surfaces which rise vertically from horizontal partition 42. FIG. 1 shows the side walls 82,84 reinforced by a series of spaced vertical members 86 which enhance the rigidity of the upper body portion 14. Movable upper segment 18 of upper body portion 14 is provided with a solid front wall 88 and a solid back wall 90. A plurality of vertical uprights 92 project between a lower horizontal edge 94 and an upper horizontal edge 96. However, instead of solid side walls, continuous windows 98 (which may be tinted) are provided along the entire side length of each movable upper segment 18 outside the uprights 92. It should be appreciated that the height and widespread viewing area of the windows 98 provides a commanding visage for passengers and enables an abundance of ambient light to flood and enhance the inside of the trailer 10 when it is in the parked condition.

Figure 2A:
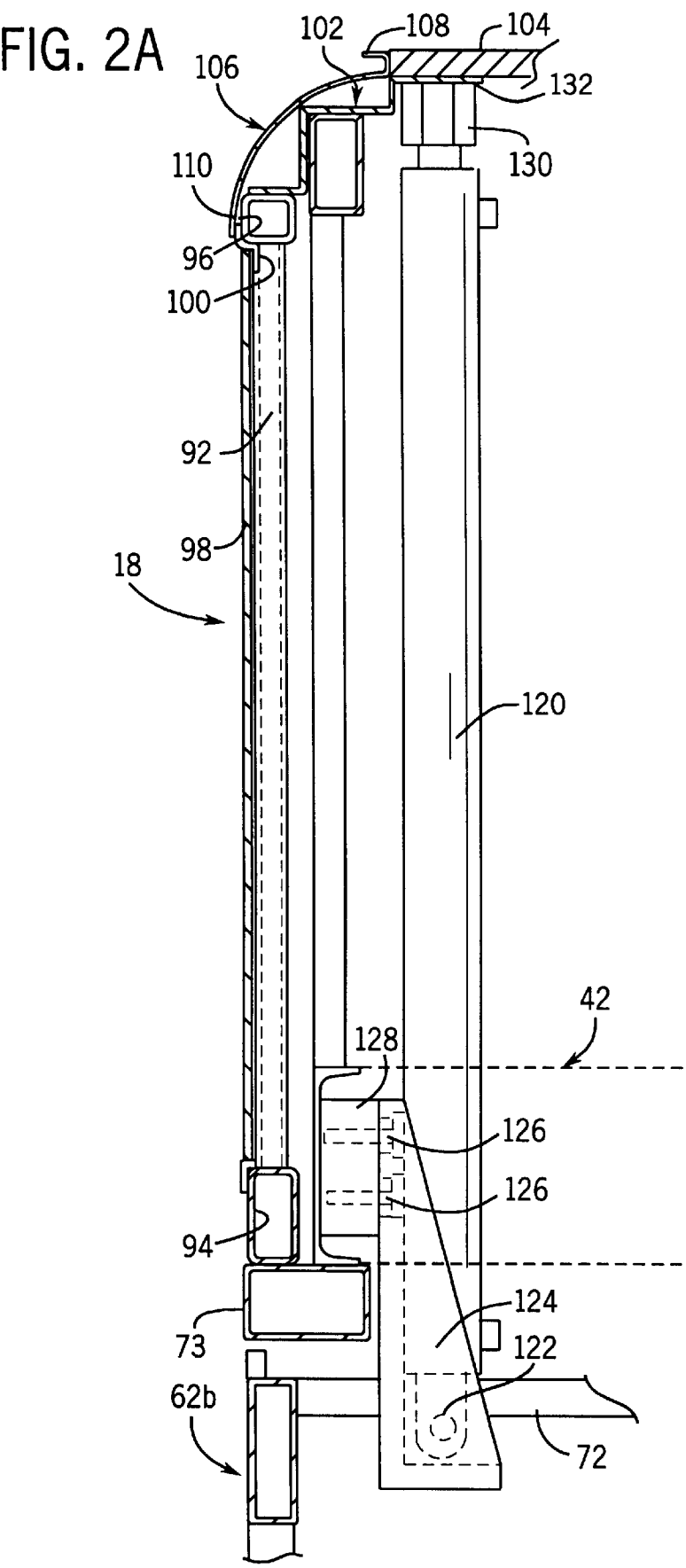
FIG. 2A is an enlarged view of a portion of the structure shown in FIG. 2.

Referring now to FIG. 2A, a plurality of Z-angled mounts 100 are interposed between windows 98 and the upper ledge 96 on each side of movable upper segment 18. Also, each of a set of stepped brackets 102 has a bottom surface welded to the top of the upper edge 96 and a top surface welded to the underside of a solid roof 104. A horizontally extending rounded corner attachment 106 on each side of trailer 10 has an upper end 108 connected to a side surface of roof 104, and a lower end 110 positioned outside the mounts 100 and the sides of the upper ledges 96. As seen in FIGS. 7 and 8, a vertically extending rounded edge 112 is interposed in each front corner between an edge of front wall 88 and an edge of corner upright 92. Similar structure is also provided in each corner at the back roof end of the trailer 10. Both the front wall 88 and the back wall 90 are reinforced by a series of uprights 114 having a hat-shaped cross section. The horizontal partition 42, fixed lower segment 16, movable upper segment 18, the roof 104, and the horizontal and vertical rounded corner structures 106 and 112, respectively, form a second internal space and an upper level 116. The horizontal partition 42 has an upper surface 118 which acts as the main floor throughout upper level 116.

The rounded corner attachments 106 and rounded edges 112 discussed above, create a more aesthetic design than square edges along the top and corners of the trailer 10. Furthermore, these rounded surfaces help reduce wind resistance during trailer travel and thus contribute to a savings in fuel for the semi-tractor pulling the trailer 10.

In addition to the horizontally movable pods 62a,62b described above, the trailer 10 is provided with the capability of vertically raising and lowering the movable upper segment 18 of upper body portion 14 with respect to the fixed lower segment 16 along a vertical axis perpendicular to the longitudinal axis of trailer 10. In order to accomplish this, a set of hydraulic cylinders 120 is positioned in the upper level 116 as generally illustrated in FIGS. 1, 1A and 4. It should be understood that the cylinders 120 are fed hydraulic fluid and are selectively regulated by a master control located (but not shown) elsewhere on trailer 10. FIG. 2A shows greater detail of the mounting of each cylinder 120 wherein a cylinder end 122 is connected to a bifurcated, saddle mount 124 having a generally triangular cross section. An upper portion of the saddle mount 124 is secured by a pair of fasteners 126 to a block support 128 which, in turn, is fixed to a side edge of the horizontal partition 42. A rod end 130 of each cylinder 120 includes a rod mount 132 which is welded to the underside of stepped bracket 102 which is joined to roof 104. With this construction, each rod end 130 is typically extended to partially raise, "pop-up", or expand the movable upper segment 18 with respect to fixed lower segment 16 when the trailer 10 is in the parked condition. Each rod end 130 is typically retracted to lower or collapse the movable upper segment 18 over the fixed lower segment 16 when the trailer is in the travel condition, as shown in phantom lines in FIG. 2. As a result, the windows 98 in their lowered position are blocked by the solid wall surfaces of the fixed lower segment 16, the overall height of the trailer 10 being reduced so as to enable further reduction in wind resistance. The movable upper segment 18 may also be lowered in the parked condition in the presence of unfavorable weather conditions, such as wind or rainstorms, or when a savings is desired in heating or cooling of the upper level 116.

Figure 5:
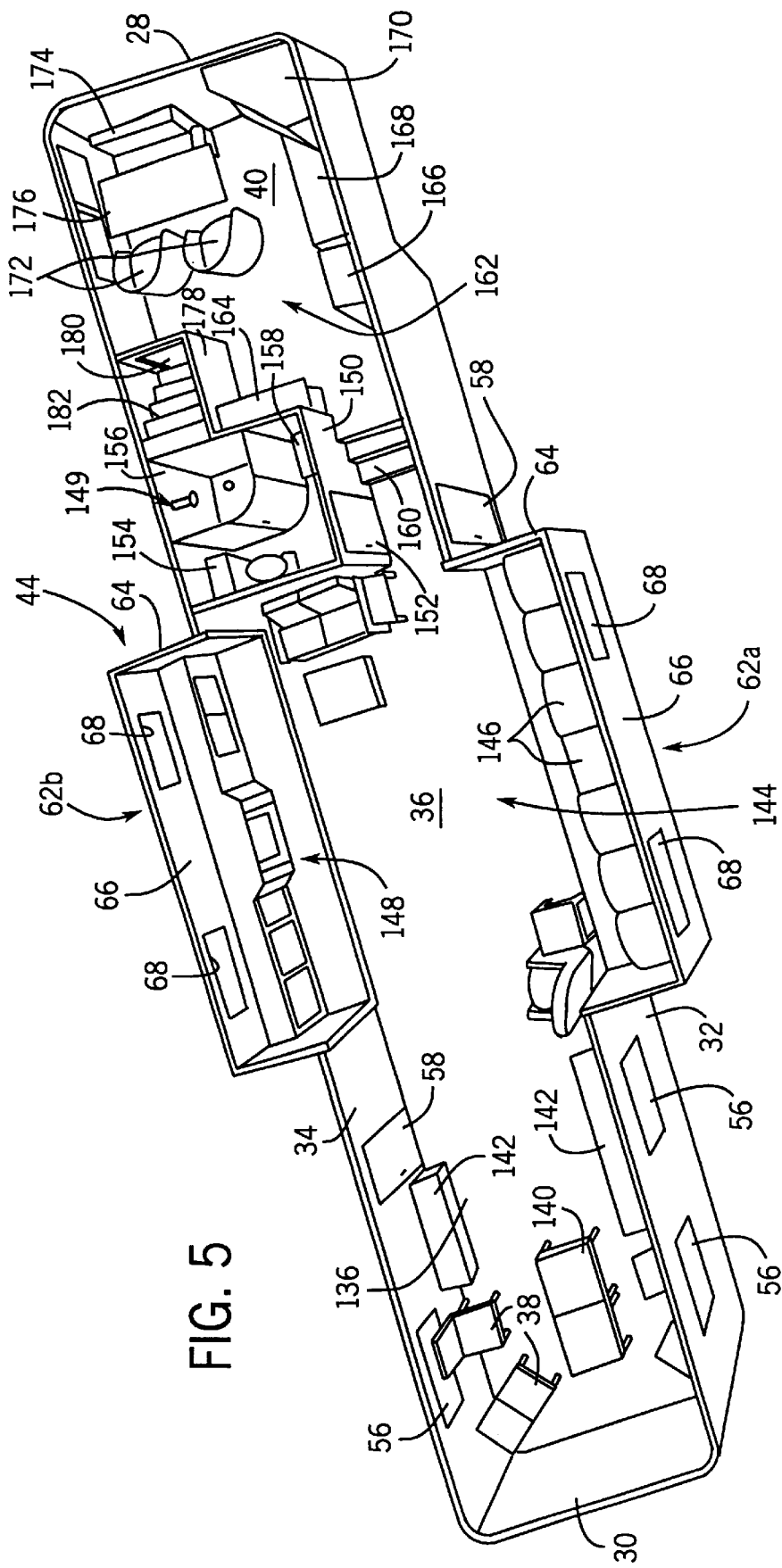
FIG. 5 is a perspective view of the lower level in the parked position with the trailer in a horizontal expanded condition.

Turning now to FIGS. 5 and 6, the present invention offers a large volume of internal space with preferred floor layouts to meet the demands of its clientele. For example, the lower level 44 includes a back sector which serves as a sitting room 136 having chairs 138, tables 140 and bench seats 142. As mentioned previously, the mid-portion of lower level 44 serves as a lounge 144 with one movable pod 62a defining a sofa area 146 and the other movable pod 62b forming an entertainment area equipped with audio/visual equipment 148. Additional chairs and tables may also be placed in the lounge 144. The front sector of the lower level 144 defines a bathroom area 149 having a wall enclosure 150 with a door 152 and includes a toilet 154, a shower 156 and a vanity 158. One entering trailer 10 through door 58 in the front section moves from main floor 36 up a set of steps 160 to the offset auxiliary floor 40 of a kitchen or galley area 162. The kitchen 162 includes a sink 164, a refrigerator 166, a stove 168, a cabinet 170, chairs 172, booth seating 174 and a table 176. Another wall 178 and door 180 leads to a staircase 182 which ascends to the main floor 118 on the upper level 116. With the trailer 10 in its vertically expanded condition, the upper level 116 shown in FIG. 6 includes a vertical wall 184 on the front end of a large bedroom 186. Included in this area is a dresser 188, a bench seat 190, chairs 192, a table 194, a bed 196, at least one sofa bed 198 and end table 200. A collapsible vertical wall 202 with a door 204 separates the bedroom 186 from a sound studio 206 having sound mixing and recording equipment 208 along with a suitable seating 210. Wall 202 typically includes a movable upper portion 212 which can be folded down from the roof 104 to cooperate with a fixed lower portion 214, as shown in FIGS. 1A and 2.

In the preferred embodiment, the trailer 10 has an overall length of approximately 46.5 feet, a width of about 8 feet, expandable in the pod areas to about 12.8 feet. In the travel and collapsed condition, the height of the trailer 10 from the ground 216 to the roof 104 is about 13.5 feet, and in the parked and expanded condition the height is substantially increased to about 17 feet. The selective raising of the movable upper segment 18 with its panoramic windows 98 presents an upper level of occupiable space with generous headroom typically over 6.75 feet high. It is preferable that the external surfaces of the aforedescribed walls are smoothly fabricated from aluminum. The walls can be insulated, soundproofed and weatherproofed as desired. The underside of the main floor 36 in the lower level 44 is adapted to carry various plumbing equipment, while heating/air conditioning and electrical equipment can be located as desired. Windows 56,68,98 may be of the type which slide open and closed and may be equipped with screens, if necessary. Trailer 10 can also be provided with fire suppression equipment, such as automatic sprinkler systems and fire extinguishers, to ensure the safety of its occupants.

It should now be appreciated that the present invention provides a reconfigurable, dual-level trailer 10 which can be customized and furnished to offer an upscale, self-contained mobile residence and/or working or business facility. From the spaciousness afforded by this structure described above, it should also be realized that a large number of occupants can be comfortably, conveniently and safely transported over long distances in the lower level. When the trailer 10 is expanded horizontally and vertically in the parked condition, the upper level 116 provides private sleeping facilities for several passengers and enables pleasure and/or business activities to take place in adjoining quarters, such as represented by the expandable lounge area 144 and the sound studio 206. It should be emphasized that the multi-compartment or modular construction of the trailer 120 provides a mobile vehicle which is extremely versatile and which heretofore has not been provided by prior art carriers.

Because of the large collapsed size of the trailer 10, it is important to provide an aerodynamic design so as to conserve fuel costs. The smooth external wall surfaces and the rounded structure 106,112 along the top and corners of the trailer 10 markedly contribute to this efficiency. The continuous windows 98 flanking each side of the upper level 116 naturally illuminate the interior thereof and reduce the need for generating electrically power light.

While the invention has been described with reference to a preferred embodiment, those skilled in the art will appreciate that certain substitutions, alterations and omissions may be made without departing from the spirit thereof.

I claim:

1. A reconfigurable, dual level trailer having a fixed length, a variable width, a variable height and a longitudinal axis, the trailer comprising:

a lower body portion supported on a set of wheels, and having a front wall, a back wall and a pair of opposite side walls;

an upper body portion disposed upon the lower body portion and having a fixed lower segment which telescopically fits within a movable upper segment, the lower segment having a front wall, a back wall and a pair of opposite side walls, the upper segment having a front wall, a back wall and opposite side portions in the form of continuous windows along the entire length of the trailer, and a roof;

a horizontal partition extending the length of the trailer between the upper body portion and the lower body portion to define an upper level and a lower level;

a mid-portion of each side wall of the lower body portion being recessed to receive a pod which is slidably mounted along a horizontal axis generally perpendicular to the longitudinal axis to selectively adjust the volume and the width of the lower level; and the upper segment being slidably mounted along a vertical axis generally perpendicular to the longitudinal axis to selectively adjust the volume and the height of the upper level, wherein a set of hydraulic cylinders are provided in the upper level to raise the upper segment with respect to the lower segment when the trailer is in a parked condition such that the windows will illuminate the interior of the trailer, and to lower the upper segment with respect to the lower segment when the trailer is in a travel condition, such that the windows are blocked by the lower segment side walls, wherein the lower level has a set of steps connecting a main floor with an offset auxiliary floor, and a staircase connecting the auxiliary floor with the upper level, and wherein the upper level includes a foldable vertical wall having a fixed lower portion attached to the horizontal partition and a movable upper portion pivotably attached to the roof.

2. The trailer of claim 1, wherein the opposite side portions of the upper segment include a lower horizontal edge, an upper horizontal edge and a series of vertical uprights extending therebetween for supporting the windows.

3. The trailer of claim 2, wherein a horizontally extending rounded corner attachment is provided along each side portion of the upper segment, the rounded corner attachment having an upper end connected to the roof and a lower end positioned outside the upper horizontal edge.

4. The trailer of claim 3, wherein a vertically extending rounded edge is interposed in each front corner between an edge of upper segment front wall and a forward most vertical upright.

5. The trailer of claim 1, wherein the lower level includes a back sector defining a sitting room, the mid-portion includes a lounge having one pod defining a sofa area and another pod defining an entertainment area having audiovisual equipment.

6. The trailer of claim 1, wherein the lower level includes a front sector defining a bathroom area and a kitchen area.

7. The trailer of claim 6, wherein the front sector of the lower level includes the staircase connecting the lower level with the upper level.

8. The trailer of claim 6, including a first door positioned in one side wall of the lower body portion opening into the front sector of the lower level.

9. The trailer of claim 8, including a second door position in the other side wall of the lower body portion opening into the back sector of the lower level.

10. The trailer of claim 1, wherein the upper level includes a bedroom area having a length which is longer than the length of the pods.

11. The trailer of claim 1, wherein the upper level includes a sound studio having sound mixing and recording equipment.

12. The trailer of claim 11, wherein the foldable wall separates the bedroom area from the sound studio.

13. The trailer of claim 1, wherein the front wall of the lower body portion includes a shelf for mounting a diesel generator and other power equipment for driving systems and appliances within the trailer.

14. An expandable trailer for presenting a maximum of floor space and headroom for occupants traveling therein, a trailer comprising:

a lower body portion having a longitudinal axis and supported on a set of wheels;

an upper body portion disposed upon the lower body portion and having a fixed lower segment which telescopically fits in a movable upper segment, the upper segment having opposed side portions formed of continuous windows along an entire length of the trailer, and a roof, the superposition of the upper body portion on the lower body portion defining a pair of front corners and a pair of rear corners;

the lower body portion having a pair of oppositely oriented pods slidably mounted along a horizontal axis generally perpendicular to the longitudinal axis for selectively adjusting the volume and width of the lower body portion;

the entire upper segment being slidably mounted along a vertical axis generally perpendicular to the longitudinal axis for selectively adjusting the volume and height of the upper body portion; and the sidewall portions of the upper segment having upper structure provided with horizontally extending rounded corner attachments along the entire length thereof, and a vertically extending rounded edge provided in each of the corners for reducing wind resistance during trailer travel, wherein a set of hydraulic cylinders are provided in the upper level to raise the upper segment with respect to the lower segment when the trailer is in a parked condition such that the windows will illuminate the interior of the trailer, and to lower the upper segment with respect to the lower segment when the trailer is in a travel condition, such that the windows are blocked by the lower segment side walls, wherein the lower level has a set of steps connecting a main floor with an offset auxiliary floor, and a staircase connecting the auxiliary floor with the upper level, and wherein the upper level includes a foldable vertical wall having a fixed lower portion attached to the horizontal partition and a movable upper portion pivotably attached to the roof.

* * * * *